UNITED STATES PATENT OFFICE.

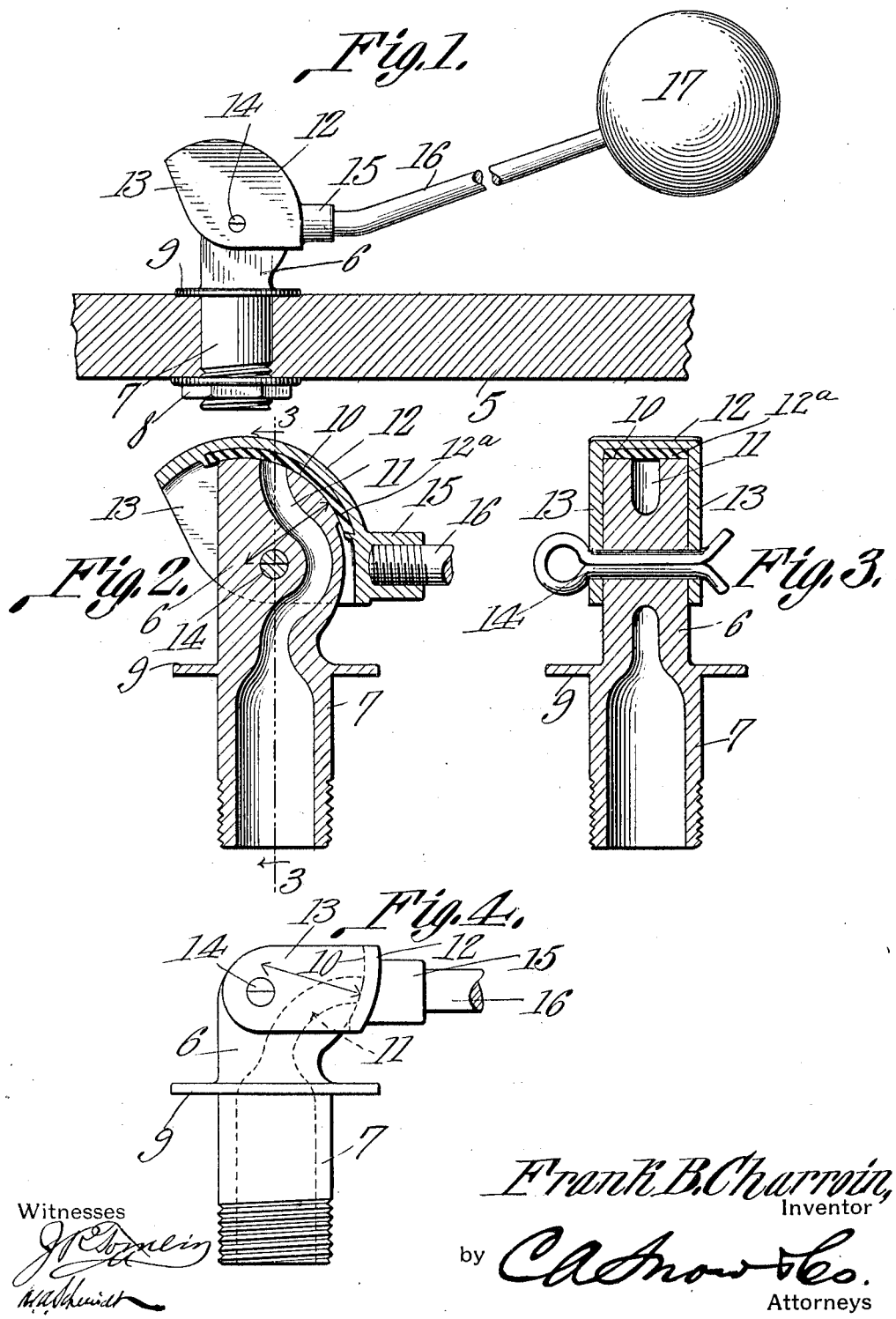

FRANK B. CHARROIN, OF SOUTH BELLINGHAM, WASHINGTON, ASSIGNOR, BY DIRECT AND MESNE ASSIGNMENTS, TO BELLINGHAM BRASS MANUFACTURING COMPANY, OF BELLINGHAM, WASHINGTON, A CORPORATION OF WASHINGTON.

FLOAT-VALVE.

1,041,025.      Specification of Letters Patent.      Patented Oct. 15, 1912.

Application filed May 31, 1910. Serial No. 564,093.

*To all whom it may concern:*

Be it known that I, FRANK B. CHARROIN, a citizen of the United States, residing at South Bellingham, in the county of Bellingham and State of Washington, have invented a new and useful Float-Valve, of which the following is a specification.

This invention relates to valves employed for controlling the flow of water or other liquid into tanks, and more particularly a valve having its opening and closing movement controlled by a float.

It is the object of the invention to provide an improved valve of this kind which shuts easily and quickly, and without noise, this result being accomplished by mounting the cut-off so that it operates transversely of the valve seat, whereby it is carried across the line of pressure in its closing movement, instead of moving straight against the pressure, and thus having to overcome such pressure.

In the accompanying drawing forming a part of this specification, Figure 1 is an elevation of the valve. Fig. 2 is a central vertical section. Fig. 3 is a vertical section on the line 3—3 of Fig. 2. Fig. 4 is an elevation of a slightly modified form of valve.

In the drawing, 5 denotes a fragment of the bottom wall of the tank to which the valve is applied. The valve casing 6 is formed with a nipple 7 which extends through an opening in the tank bottom, and projects a short distance therefrom on the outside, and is screw threaded to receive a coupling nut 8, which when seated holds the valve secure in place. The nipple is also formed with a flange 9 which engages the inner surface of the tank bottom. In order to make a water tight joint, gaskets will be interposed between the outer surface of the tank and the nut.

The cut off 12 seats on the upper end of the valve casing 6, and is curved on an arc struck from a center which is located to one side of the pivotal axis of the cut off. The valve contains a passage 11 which opens through the valve seat and also communicates with the bore of the nipple 7.

The cut off is in the form of a hood inclosing the outer end of the valve casing 6, and has on the inside thereof a curved surface faced with a rubber or other gasket 12ª which is adapted to engage the seat 10, the curved surface of the gasket coinciding with the curved surface of the valve seat when the valve is closed, so that the gasket may seat snugly thereon. The sides 13 of the cut-off fit the opposite sides of the valve casing, and a pin 14 passing through said parts forms the pivot on which the cut off swings, and is arranged horizontally so that the cut off will swing in a vertical plane. On the cut off is a boss 15 into which screws the stem 16 of an ordinary float 17, the stem extending from the cut off in such a direction that the rise and fall of the float swings the valve on its pivot.

The operation of the valve will be apparent from an inspection of Fig. 2. As the curve of the valve seat is the arc of a circle having its center located to one side of the pivot 14, and the cut off swings to open and closed position in the arc of a circle having the pivot for its center, the cut off does not slide on the seat, nor does it move to closed or open position in a straight line parallel to the line of pressure, but in a curve across the same. The center of this curve is in perpendicular alinement with the center of the outlet end of the passage 11. By this arrangement, an increased leverage is obtained, and the cut off is also enabled to shut tightly against a high pressure. The cut off also makes a quick and noiseless shut off, and when opening comes at once to wide open position. The passage 11 is deflected laterally, as shown in Fig. 2, so as to clear the pivot 14.

In the modified form of valve shown in Fig. 4, the arrangement of the curved surfaces is the same as that already described, the only difference being that the passage 11 opens through the side of the valve casing, the center of the curvature of said surfaces being located above the pivot of the cut off, and in perpendicular alinement therewith. The operation of this form of valve is the same as the one already described.

What is claimed is:

The combination with a valve casing having an external arcuate seat and an outlet therethrough, of a cut off cap movable on an axis eccentric to the curvature of the seat and having an arcuate face corresponding to the curvature of the seat and arranged to engage a substantial portion of the seat on opposite sides of the outlet when the valve is closed, whereby to preclude leakage, to insure noiseless closing and to compensate for wear, the cap having sides embracing the casing and pivoted thereto, and means on the cap located substantially at one end of the face and adapted to receive a buoyant means for operating the cut-off.

In testimony that I claim the foregoing as my own, I have hereto affixed my signature in the presence of two witnesses.

FRANK B. CHARROIN.

Witnesses:
WILLIAM WEBER,
DAVID DAYS.